(12) United States Patent
Nedorezov et al.

(10) Patent No.: US 9,303,701 B2
(45) Date of Patent: Apr. 5, 2016

(54) METHOD OF CONTROLLING A TRANSMISSION HAVING AN IMPELLER CLUTCH

(71) Applicant: FORD GLOBAL TECHNOLOGIES, LLC, Dearborn, MI (US)

(72) Inventors: Felix Nedorezov, Rochester Hills, MI (US); Zhengyu Dai, Canton, MI (US); Weitian Chen, Windsor (CA); Hong Jiang, Birmingham, MI (US); Seunghoon Lee, Northville, MI (US); Matthew John Shelton, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 140 days.

(21) Appl. No.: 14/332,728

(22) Filed: Jul. 16, 2014

(65) Prior Publication Data

US 2016/0017933 A1    Jan. 21, 2016

(51) Int. Cl.
*F16D 33/18*    (2006.01)

(52) U.S. Cl.
CPC ..................... *F16D 33/18* (2013.01)

(58) Field of Classification Search
CPC ..................................................... F16D 33/18
USPC ..................................................... 701/67, 68
See application file for complete search history.

(56) References Cited

U.S. PATENT DOCUMENTS

| 5,029,087 | A  | * | 7/1991  | Cowan    | F16H 61/143 192/3.3   |
| 5,121,820 | A  | * | 6/1992  | Brown    | F16H 61/143 192/3.29  |
| 6,508,345 | B1 | * | 1/2003  | Yoshimoto| F16H 45/02 192/3.25   |
| 7,644,812 | B2 |   | 1/2010  | Simpson et al. |               |
| 7,815,026 | B2 |   | 10/2010 | Povirk et al.  |               |
| 7,854,683 | B2 |   | 12/2010 | DeGeorge et al.|               |
| 8,568,276 | B2 |   | 10/2013 | Tsuzuki et al. |               |
| 2008/0149441 | A1 | * | 6/2008 | Sturgin  | F16H 45/02 192/3.25  |
| 2008/0227597 | A1 | * | 9/2008 | Povirk   | F16H 45/02 477/62    |
| 2013/0151098 | A1 |   | 6/2013 | Berry et al. |                 |
| 2013/0296103 | A1 |   | 11/2013| Dai et al.   |                 |

* cited by examiner

*Primary Examiner* — Jacob S Scott
(74) *Attorney, Agent, or Firm* — James Dottavio; Brooks Kushman P.C.

(57) ABSTRACT

Impeller speed, which is difficult to measure when a torque converter includes an impeller clutch, is estimated based on a known relationship among impeller speed, turbine speed, and turbine torque. Turbine torque may be directly measured by a turbine torque sensor or estimated based on other measurements such as output shaft torque or vehicle acceleration. The relationship is stored in a controller in terms of the coefficients of a second order polynomial relating turbine torque to impeller speed and turbine speed. A slip speed is calculated based on a measured input shaft speed and the estimated impeller speed. Closed loop control is used to adjust the impeller clutch torque capacity to maintain a target slip.

13 Claims, 3 Drawing Sheets

METHOD OF CONTROLLING A TRANSMISSION HAVING AN IMPELLER CLUTCH

TECHNICAL FIELD

This disclosure relates to the field of vehicle controls. More particularly, the disclosure pertains to control of a transmission system that includes a torque converter having an impeller disconnect clutch.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Even with a very high speed ratio selected, the gearbox input speed is zero when the vehicle is stationary. Since an internal combustion engine is incapable of generating torque at zero shaft speed, some type of launch device is typically employed between the engine and the gearbox input shaft. A common launch device for automatic transmissions is a fluid coupling. A fluid coupling is a hydrodynamic torque transfer device having an impeller and a turbine in a torus shape surrounding the transmission axis. When the impeller rotates faster than the turbine, the impeller causes fluid to rotate in the torus exerting torque on the turbine and a resistance torque on the impeller. A torque converter is a fluid coupling that also includes a stator that is held against rotation. The stator redirects the flow such that the torque applied to the turbine is greater than the resistance torque on the impeller. When the vehicle is stationary, the turbine is also stationary but the impeller may be coupled to the engine crankshaft. Due to the speed difference between impeller and turbine, the impeller resist rotation of the crankshaft. The resistance torque is small enough that it does not stall the engine. However, the engine must consume additional fuel, beyond that required for unloaded idle, in order to overcome the resistance torque. A multiple of the engine torque is transmitted to the gearbox input which is coupled to the turbine.

SUMMARY OF THE DISCLOSURE

A transmission includes a torque converter and a controller. The torque converter includes an impeller selectively coupled to a transmission input shaft by an impeller clutch and a turbine driven hydro-dynamically by the impeller. The controller adjusts a torque capacity of the impeller based on an estimated impeller speed. The impeller speed is estimated based on estimates of the turbine speed and turbine torque and a known relationship among impeller speed, turbine speed, and turbine torque. The known relationship may be stored, for example, as a second order polynomial of impeller speed and turbine speed yielding turbine torque. The controller may estimate the impeller speed by solving such an equation for impeller speed. The controller may adjust the impeller clutch torque capacity to maintain a target slip speed between the impeller and the input shaft using a measurement of the input shaft speed and the estimate of the impeller speed.

A method of controlling an impeller clutch includes measuring a turbine speed, estimating a turbine torque, estimating an impeller speed based on the turbine speed and turbine torque, and then adjusting the torque capacity based on the estimated impeller speed. The method may also include measuring a transmission input speed and estimating an impeller clutch slip by subtracting the estimated impeller speed from the measured transmission input speed. The torque capacity may be adjusted to maintain a target slip speed. The turbine torque may be estimated by receiving a signal from a turbine shaft torque sensor. Alternatively, the turbine torque may be estimated by estimating the torque on a different shaft, such as an output shaft, and dividing by a known torque ratio.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
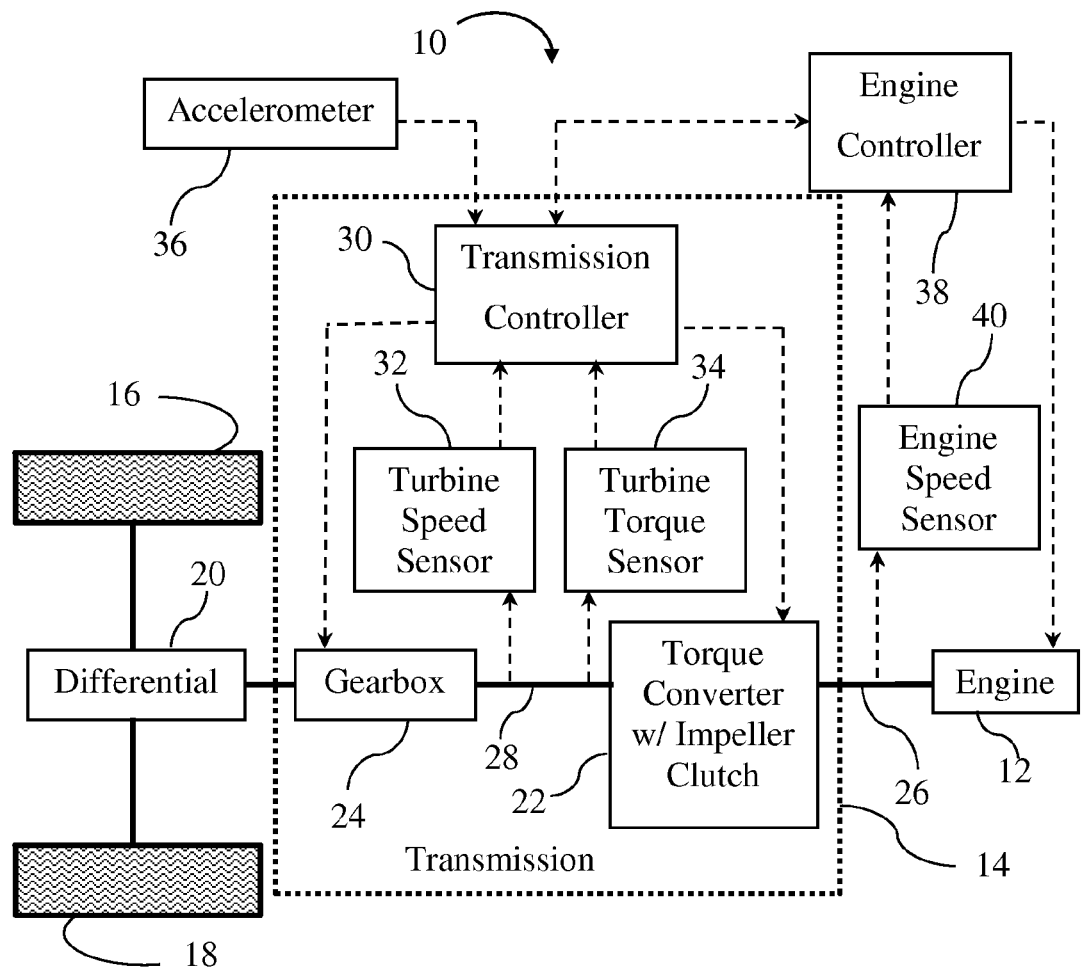
FIG. 1 is a schematic illustration of a vehicle powertrain.

FIG. 1 schematically illustrates a vehicle powertrain 10. The heavy lines indicate the flow of mechanical power, whereas the dashed lines indicate the flow of information. An internal combustion engine 12 generates mechanical power by converting stored chemical energy in a fuel source. Transmission 14 adapts the speed and torque of the mechanical power produced by the engine to suit the current needs of the vehicle. Mechanical power from transmission 14 is routed to left and right wheels 16 and 18 by differential 20. Differential 20 provides roughly equal torque to each wheel while accommodating slight differences in speed such as when the vehicle turns a corner. In a rear wheel drive vehicle layout, the differential also changes the axis of rotation by roughly 90 degrees and adjusts the speed and torque by a fixed final drive ratio. In a front wheel drive configuration, the differential may be integrated into the transmission, which may be called a transaxle.

The transmission 14 includes two power transfer stages, a torque converter with an impeller clutch 22 and a gearbox 24.

The torque converter transmits power and torque from transmission input shaft 26 to turbine shaft 28. The gearbox 24 provides a number of speed ratios including multiple forward speed ratios and at least one reverse speed ratio. Gearbox 24 may include a number of controllable clutches that are engaged in various combinations to establish various fixed speed ratios. Alternatively or in combination, gearbox 24 may include a variator capable of establishing any speed ratio between fixed limits. The variator and clutches respond to commands from transmission controller 30. These commands may be conveyed, for example, by adjusting an electrical current which, in turn, adjust a pressure of a fluid in a piston apply chamber. Transmission controller 30 determines the appropriate commands based on input information from a number of sensors. These sensors may include a turbine speed sensor 32, a turbine torque sensor 34, or an accelerometer 36. Transmission controller 30 is in two way communication with engine controller 38 which sends commands to engine 12 to regulate mechanical power production. Engine controller 38 receives signals from a variety of sensors such as engine speed sensor 40 and may make these signals available to transmission controller 30 via a controller area network. Although transmission controller 30 and engine controller 38 are illustrated as separate communicating controllers, their functions may be integrated into a single controller or distributed to other communicating controllers in the vehicle.

Figure 2:
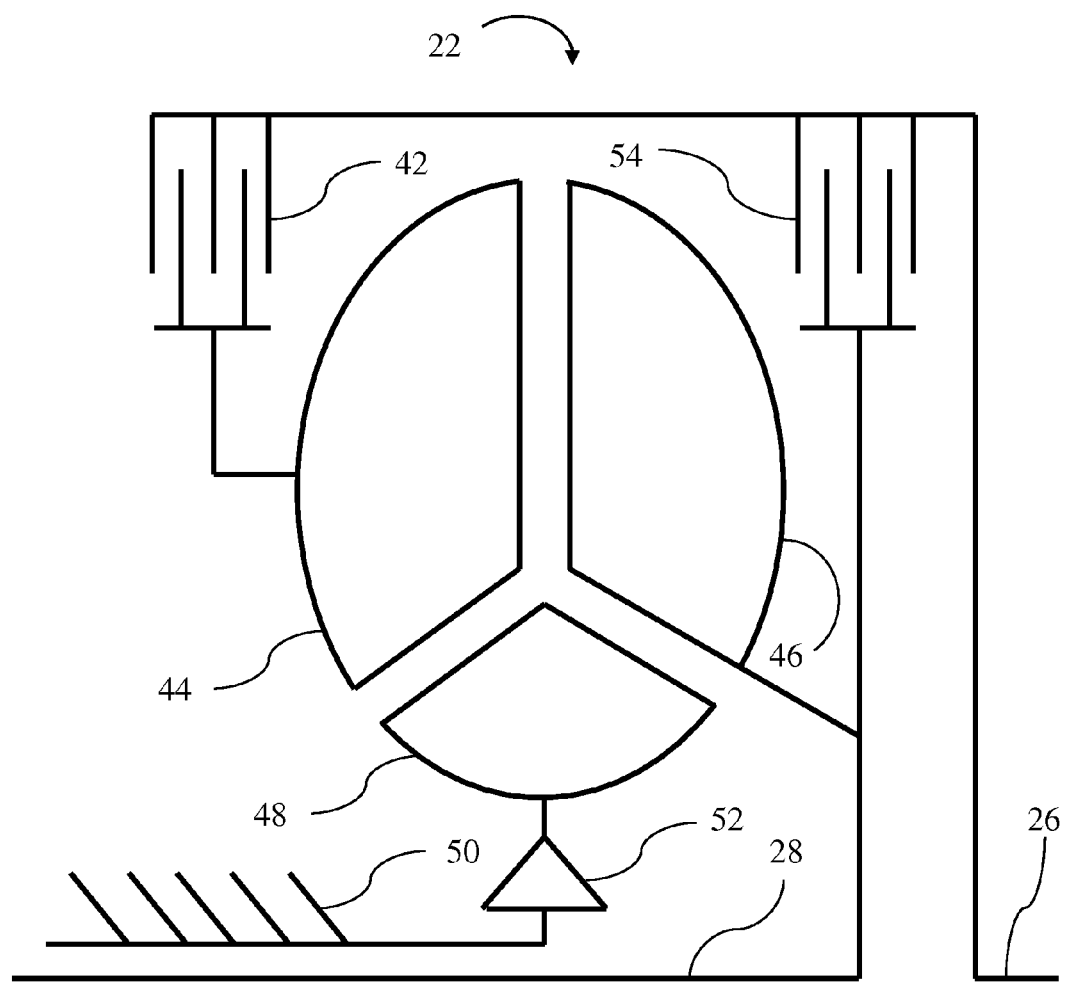
FIG. 2 is a schematic illustration of a torque converter having an impeller clutch.

FIG. 2 schematically illustrates torque converter 22. Torque converter 22 provides two parallel power flow paths from transmission input shaft 26 to turbine shaft 28. A hydrodynamic power flow path includes impeller clutch 42, impeller 44, and turbine 46. Impeller 44 is selectively coupled to input shaft 26 by impeller clutch 42. An impeller clutch is an actively controlled friction clutch that selectively couples an impeller of a torque converter to a transmission input shaft. Turbine 46 is fixedly coupled to turbine shaft 28. Stator 48 is coupled to transmission housing 50 by passive one way clutch 52. At low turbine shaft speeds, when impeller clutch 42 is at least partially engaged, impeller 44 causes fluid to flow around the torus from impeller 44 to turbine 46 to stator 48 and back to impeller 44. Stator 48 is held against rotation by one way clutch 52 such that it can redirect the flow and provide a reaction torque for torque multiplication. As the speed of turbine 46 approaches the speed of impeller 42, fluid in the torus flows circumferentially around the input shaft with the impeller and turbine. One way clutch 52 then overruns such that stator 48 can rotate rather than impeding this flow. Transmission input shaft 26 is selectively coupled to turbine shaft 28 by bypass clutch 54 providing a second power flow path.

Both impeller clutch 42 and bypass clutch 54 are actively controlled friction clutches with torque capacities that respond to changes in fluid pressure in hydraulic circuits. The hydraulic circuits may be dedicated circuits whose only function is to control the clutch. Alternatively, the hydraulic circuits may also be used for other functions such as supplying fluid to the torque converter torus. When the torque capacity is commanded to zero, the elements that are selectively coupled by the clutch are free to rotate at different speeds and the only torque transferred is a small parasitic drag torque. This is called an open state. In a partially engaged state, the elements selectively coupled by a clutch are rotating at different speeds and the clutch capacity is greater than zero. A torque equal to the clutch torque capacity is applied to the slower element and a torque in the opposite direction is applied to the faster element. When the elements are rotating at the same speed, the clutch is said to be fully engaged. In the fully engaged state, the transmitted torque is determined by the torques applied to the elements by other components. However, if that torque exceeds the clutch torque capacity, then slip develops between the elements and the clutch transitions to the partially engaged state.

Power flow through the hydrodynamic power flow path is governed by the speed of impeller 44, $\omega_{imp}$, and the speed of turbine 46, $\omega_{trb}$. The relationship between the speeds and the torques is a complex function of torus geometry and of the blade angles of the impeller, turbine, and stator. At a constant turbine speed, both impeller torque, $T_{imp}$, and turbine torque, $T_{trb}$, increase as impeller speed increases. The ratio of turbine torque to impeller torque generally increases as the ratio of impeller speed to turbine speed increases. However, these relationships are not linear. The turbine torque and impeller torque at any particular combination of turbine speed and impeller speed can be determined by computational fluid mechanics modeling or by empirical testing using a dynamometer. Once determined at a sufficient number of values of impeller speed and turbine speed, the results may be stored in a table and sufficiently accurate estimates of turbine torque may be calculated at other points using interpolation. Alternatively, a function may be fit to the data. Specifically, a second order polynomial function of the form:

$$T_{trb} = a\omega_{imp}^2 + b\omega_{imp}\omega_{trb} + c\omega_{trb}^2 + d\omega_{imp} + e\omega_{trb} + f \qquad \text{Eq. 1}$$

may be utilized to estimate impeller speed. Storing a second order polynomial of this form only requires storing the six coefficients a-f.

When the vehicle is stationary with the engine running, as it would be while waiting for a traffic light, the torque capacity of the impeller clutch may be commanded to zero. Opening the impeller clutch relieves the resistance torque that the impeller would otherwise exert on the engine, permitting the engine to maintain idle at a lower fuel flow rate. Once the impeller clutch is released, the torque on the impeller acts to slow the impeller inertia until the impeller, like the turbine, is stationary. In some vehicles, the engine may be turned off while the vehicle is waiting at a traffic light and automatically restarted when the driver releases the brake pedal. Releasing the impeller clutch until after the engine restart event prevents torque disturbances associated with the restart event from being transmitted to the driveline.

When vehicle acceleration is desired, the impeller clutch is engaged. During the transition from open to fully engaged, the impeller clutch is in a partially engaged state in which the impeller speed is faster than the turbine speed but slower than the engine speed. The torque capacity is commanded to a level higher than the impeller torque. The difference between the clutch torque and the impeller torque acts to overcome the inertia of the impeller and increase the impeller speed toward the engine speed. When the impeller speed reaches the engine speed, the impeller clutch transitions to a fully engaged state in which the clutch torque is equal to the impeller torque. If the torque capacity at that moment is substantially greater than the impeller torque, then a sudden change in torque results. Sudden changes in torque levels within the powertrain may trigger torsional vibration modes that vehicle occupants feel or hear. Consequently, the control system attempts to control the torque capacity of the clutch at the end of the engagement process such that the fully engaged state is approached gradually. This is accomplished most effectively using closed loop control with current impeller speed as a feedback signal.

The amount of torque that an internal combustion engine is capable of producing may depend upon the engine speed. For turbocharged engines, maximum torque may not be available until the engine has operated at the elevated speed for several seconds. When the impeller clutch is engaged, the impeller speed is determined by the turbine speed and the current torque level. In some circumstances, it may be desirable to operate the engine at a higher speed than impeller speed in order to make more torque available or to prepare for a potential increase in the torque requirement. In such circumstances, the control system may intentionally maintain a desired degree of slip across the impeller clutch. In other words, the controller commands an impeller clutch torque capacity such that the impeller speed is less than the engine speed by a desired amount. This is also accomplished most effectively using closed loop control.

Due to the topology of the torque converter, it is technically difficult to install a speed sensor to directly measure the impeller speed. Although it may be infeasible to measure impeller speed directly, impeller speed may be estimated based the relationship among impeller speed, turbine speed, and turbine torque. Turbine speed may be determined by reading turbine speed sensor 32. Turbine torque may be determined by reading turbine torque sensor 34. When the coefficients of equation 1 are stored, the impeller speed may be calculated using the equation:

$$\omega_{imp} = \frac{-(b\omega_{trb} + d) + \sqrt{(b\omega_{trb} + d)^2 - 4a(c\omega_{trb}^2 + e\omega_{trb} + f - T_{trb})}}{2a}.$$

Eq. 2

Figure 3:
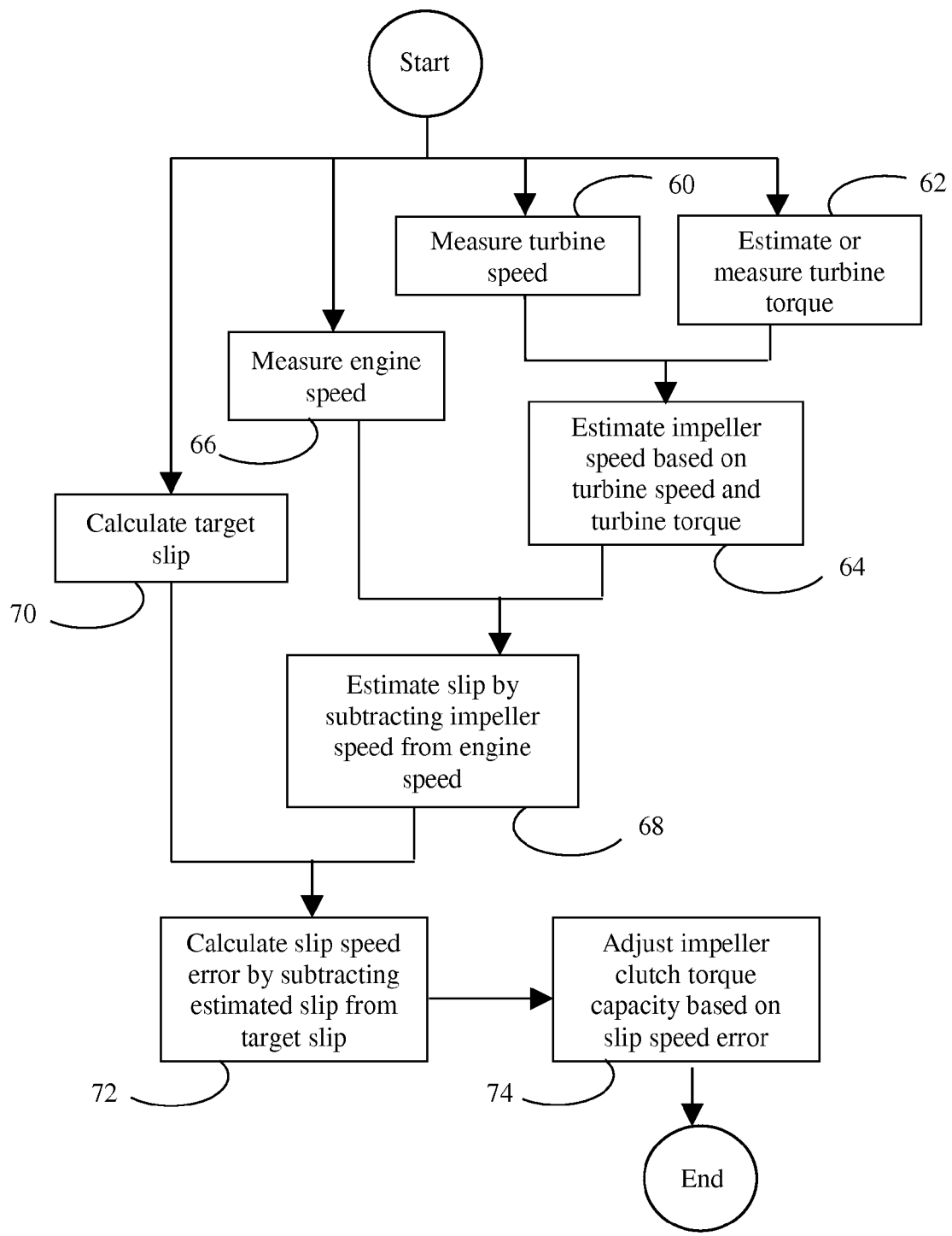
FIG. 3 is a flowchart of a method of controlling the impeller clutch of FIG. 2.

FIG. 3 is a flow chart for impeller clutch control according to the present invention. At 60, controller 30 measures turbine speed by reading a signal from turbine speed sensor 32 for example. At 62, controller 30 estimates or measures turbine torque by reading a signal from turbine torque sensor 34 for example. At 64, controller 30 estimates the impeller speed based on the relationship among impeller speed, turbine speed, and turbine torque. For example, controller 30 may utilize equation 2. At 66, controller 30 obtains a measurement of engine speed. This measurement may be communicated from engine controller 38 based on a reading from engine speed sensor 40. Alternatively, transmission 14 may include a transmission input shaft speed sensor. The impeller clutch slip is estimated at 68 by subtracting the estimated impeller speed from the engine speed. At 70, controller 30 determines a target impeller clutch slip. The slip speed error is computed at 72 by subtracting the estimated slip from the target slip. At 74, the commanded impeller clutch torque capacity is adjusted. If the slip speed error is negative, meaning that the impeller is rotating slower than desired, then the clutch capacity is increased. If, on the other hand, the slip speed error is positive, then the clutch capacity is decreased. In some embodiments, the closed loop torque capacity computed by this algorithm may be combined with an open loop impeller clutch torque capacity (feed forward term) to respond more quickly to changes in target slip or commanded engine torque.

If the transmission is not equipped with a turbine speed sensor, turbine speed can be calculated based on other inputs. When the speed ratio of gearbox 24 is known, turbine speed can be calculated based on other speed measurements, such as a speed of the driveshaft or wheel speed. Similarly, if the transmission is not equipped with a turbine torque sensor, turbine torque can be estimated based on other measurements. For example, when gearbox 24 is in a stable, known state, the relationship between turbine torque and transmission output torque may be known. The ratio of turbine torque to transmission output torque is equal to the gearbox speed ratio once parasitic losses are considered. Gearbox parasitic losses may be estimated with sufficient accuracy based on speed ratio, turbine speed, and transmission output torque. Transmission output torque may be measured with a transmission output torque sensor. Alternatively, transmission output torque may be estimated based on a reading of accelerometer 36.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A method of controlling an impeller clutch comprising:
measuring a turbine speed;
estimating a turbine torque;
estimating an impeller speed based on the turbine speed and the turbine torque; and
adjusting a torque capacity of the impeller clutch based on the estimated impeller speed to maintain the impeller speed between an input shaft speed and the turbine speed.

2. The method of claim 1 further comprising:
measuring a transmission input speed; and
estimating an impeller clutch slip by subtracting the estimated impeller speed from the measured transmission input speed.

3. The method of claim 1 wherein estimating the turbine torque comprises receiving a signal from a turbine shaft torque sensor.

4. The method of claim 1 wherein estimating the turbine torque comprises:
estimating an output shaft torque; and
dividing the output shaft torque by a gearbox torque ratio.

5. The method of claim 1 wherein estimating the impeller speed comprises
storing a representation of an equation equating the turbine torque to a function of the impeller speed and the turbine speed; and
solving the equation for the impeller speed based on the measured turbine speed and the estimated turbine torque.

6. The method of claim 5 wherein the function is a second order polynomial.

7. A transmission comprising:
an impeller;
a clutch configured to selectively couple the impeller to an input shaft;
a turbine; and
a controller programmed
to estimate a turbine speed and a turbine torque, to estimate an impeller speed based on a relationship among impeller speed, turbine speed, and turbine torque, and to adjust a torque capacity of the clutch based on the estimated impeller speed.

8. The transmission of claim 7 wherein the controller is further programmed to receive a signal indicating a speed of the input shaft; and to calculate an impeller clutch slip by subtracting the estimated impeller speed from the speed of the input shaft.

9. The transmission of claim 8 wherein the controller receives the signal indicating the speed of the input shaft over a controller area network.

10. The transmission of claim 7 wherein the controller stores a representation of an equation equating turbine torque to a function of impeller speed and turbine speed and estimates the impeller speed by solving the equation for the impeller speed using the estimated turbine speed sensor and the estimated turbine torque.

11. The transmission of claim 10 wherein the function is a second order polynomial.

12. A method comprising:

receiving signals from a turbine speed sensor and a turbine torque sensor; and adjusting a torque capacity of an impeller clutch based on the signals to maintain a target impeller slip.

13. The method of claim 12 further comprising:

receiving a signal from a transmission input speed sensor; and wherein the torque capacity of the impeller clutch is adjusted to maintain a target slip speed between an impeller and a transmission input shaft.

* * * * *